H. Curtner.
Water Governor.
Nº 96,896.      Patented Nov. 16, 1869.
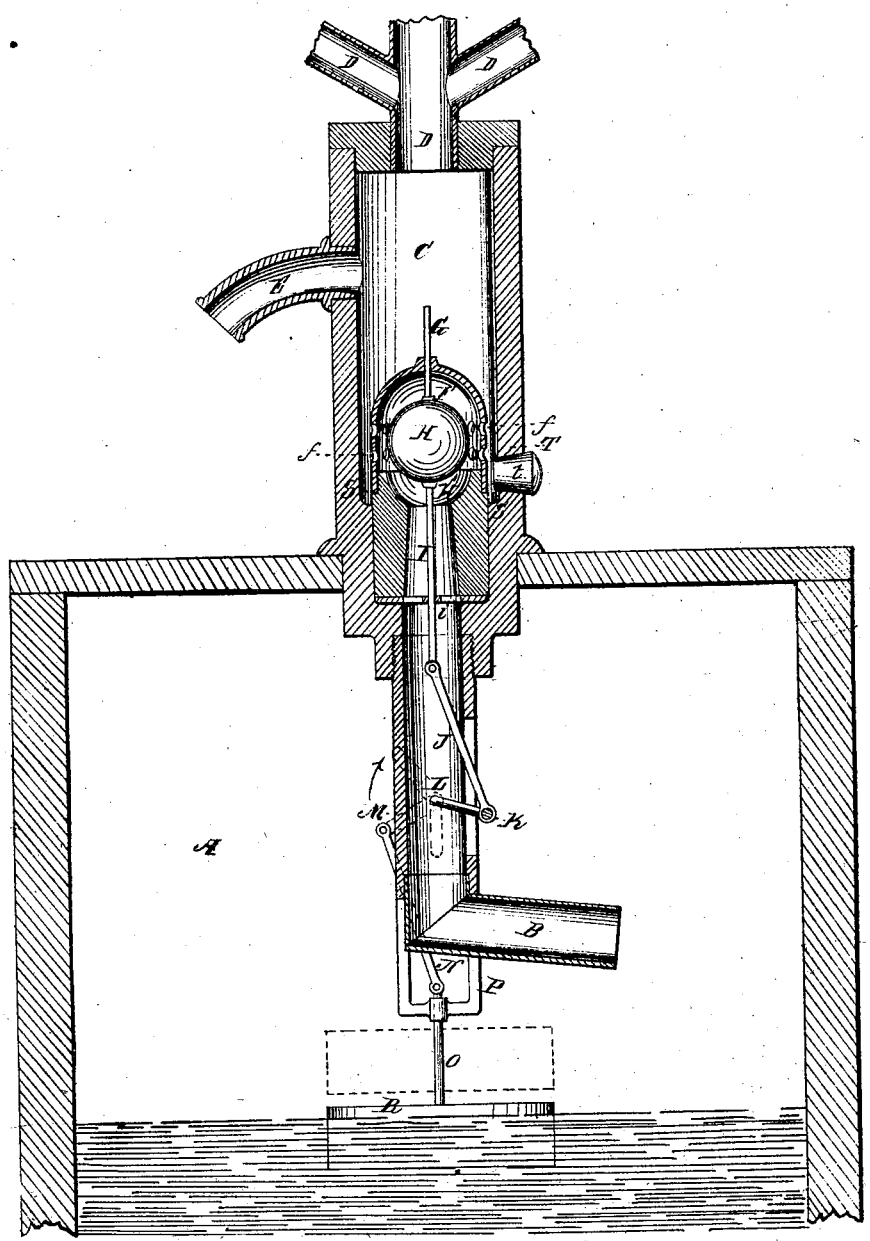
Witnesses                              Inventor
Jos. H. Layman.                  H. Curtner
Sam. Haight               By Knight Bros.
                                                  Attys

United States Patent Office.

HENRY CURTNER, OF ANNA, OHIO, ASSIGNOR TO HIMSELF AND ELI RAGON, OF SAME PLACE.

Letters Patent No. 96,895, dated November 16, 1869.

IMPROVEMENT IN WATER-GOVERNORS.

The Schedule referred to in these Letters Patent and making part of the same.

*To whom it may concern:*

Be it known that I, HENRY CURTNER, of Anna, Shelby county, Ohio, have invented a new and useful Water-Governor; and I hereby declare the following to be a full, clear, and exact description thereof, reference being had to the accompanying drawings, making part of this specification.

My invention relates to a device to prevent the water in a penstock, or in a cistern, from rising above the desired level, and consists of a float from whose centre rises a rod, which, through medium of connections hereafter described, acts upon a ball-valve to admit water when the level is depressed below the desired point, and to close the valve when the water has attained the proper level.

The drawing shows a vertical section of my invention.

A is a tank, cistern, penstock, or forebay.

B is a supply-spout leading from a valve-chamber, C, into which the water flows from either of the pipes D D'.

E is a waste-spout.

F is a cap or cover, to protect the valve H from the direct action of the inflowing water, and this cap or cover may be perforated, as shown, to allow the passage of the guide-rod G ascending from the valve.

The valve-seat block H' is removable from the valve-chamber, when desired, for regrinding of the valve, or for renewal.

The valve-stem I slides in a guide-piece, *i*, and is connected, by a pitman, J, with the crank K of a rock-shaft, L, whose other end has a crank or disk, M, connected by a pitman, N, with the top of the float-rod O, which slides vertically in a boxing, P, attached to the spout B.

The rod O is secured axially in the float R, and is actuated by the latter when the water-level changes, so as to cause the ascent or descent of the float, and consequently that of the ball-valve.

The valve-cap F has perforations *f*, and its lower portion is surrounded by an annular chamber, S, from which the accumulating mud may be drawn through an aperture, T, usually closed by a plug, *t*.

In the drawing, the valve is represented as raised to allow the inflow of water, and the float is consequently seen in its depressed position.

The positions of the float and rock-shaft, with the cranks K M, when the water has attained the proper level, is shown in dotted lines.

It will be seen that as the float rises by the influx of water, the crank M is raised and the crank K depressed, so that on the water attaining its proper level, the valve is drawn down upon its seat and stops the inflow of water, which then passes off through the waste-spout E.

This device may be applied to various uses, but, besides its connection with the rain-water spout of a cistern, it is chiefly anticipated to apply it to the head-water of a water-wheel, so as to keep an equal pressure upon the wheel at all times, and to enable the running of the machinery at a uniform velocity under an irregular supply of water.

I claim herein as new, and of my invention—

The combination and arrangement of the float R, axial rod O, pitmen N and J, and rock-shaft M L K, vertical guiding-stem I, ball-valve H, and removable seat-block H', all substantially as and for the purpose described.

In testimony of which invention, I hereunto set my hand.

HENRY CURTNER.

Witnesses:
JOSEPH P. STALEY,
N. R. WYMAN.